3,343,339
METHOD FOR OBTAINING AN ENRICHED $H_2$ PHASE FROM A MIXTURE OF $H_2$, $CH_4$ AND $NH_3$
Jerrold J. Johnston, Orange, Tex., assignor to E. I. du Pont de Nemours and Company, Wilmington, Del., a corporation of Delaware
No Drawing. Filed Jan. 11, 1965, Ser. No. 424,814
3 Claims. (Cl. 55—68)

This invention relates to a method for the recovery of hydrogen from mixtures with methane and ammonia.

It is known that in industrial chemistry, the catalytic hydrogenation of organic compounds can be carried out at high pressures using ammonia as a diluent for the process. Commonly, the hydrogen employed is obtained by the pyrolysis of a methane and water mixture, the resultant hydrogen containing a small amount of methane. The presence of the methane does not affect the hydrogenation catalyst but does serve as a diluent, adversely affecting the performance of the hydrogenation system. The off-gas from the hydrogenation system contains hydrogen and methane together with ammonia. In order to operate efficiently, it is desirable to separate the hydrogen from the ammonia and recycle this to the hydrogenation unit. However, prior to the present discovery all of the methane would have been recycled with the hydrogen leading to an increasing build-up of methane and decreasing efficiency of the process. Accordingly, the present invention is directed to the separation of hydrogen from ammonia and methane by a simple process which is broadly described:

A feed consisting essentially of a mixture of 30 to 98 mole percent of ammonia together with from 2 to 70 mole percent of hydrogen and methane, the hydrogen to methane molar ratio being from 0.5 to 10, is adjusted to a pressure of from 1,000 to 2,000 p.s.i.g., preferably from 1,000 to 1,300 p.s.i.g. at a temperature of 25° C. to 100° C. and preferably from 25° C. to 50° C. separating a gas phase containing predominately hydrogen and methane having a hydrogen to methane molar ratio substantially greater than the feed, and a liquid phase consisting predominately of methane dissolved in liquid ammonia.

It has been discovered that under the above specified conditions, methane is selectively dissolved in liquid ammonia, and at the same time hydrogen is efficiently released. Increasing the pressure decreases the efficiency of separating hydrogen from methane, however, below about 1,000 p.s.i. excessive amounts of ammonia are released to the gas phase. The preferred operating range is from about 1,000 to 1,300 p.s.i. In the preferred range decreasing the temperature improves both the separation of hydrogen from methane and from ammonia, and accordingly it is preferred to operate from temperatures of about 25° C. to 50° C. At temperatures higher than 50° C., it is preferable to operate at higher pressures to avoid excessive ammonia in the gas phase.

The separation can be conducted in conventional equipment employed for the separation of a gaseous and a liquid phase such as cyclone separators, impingement precipitators or combinations of such devices which are well known in the art.

This invention is further illustrated by the following example, which is not, however, intended to fully delineate the scope of this discovery.

EXAMPLE

In this example, a cyclone separator was employed consisting of a vertical cylindrical vessel 8 inches in diameter and 4½ feet in height. The vessel was fitted with a tangential entry nozzle in the side wall adjacent to the top of the vessel. An exit pipe for the recovered gas phase was fitted through the closed top concentrically 2 feet downwards into the vessel. The separator vessel was connected to a liquid receiver consisting of a cylindrical vessel 30 inches in diameter and 9 feet in length. Fitted to this vessel was an inlet of 8 inch diameter pipe extending through the top of the vessel, to which inlet the cyclone separator was bolted. The pipe continued 6½ feet into the receiver. The collector was provided with a take off for liquid in the side wall 10 inches above the bottom of the 8 inch inlet tube from the cyclone separator. A gas vent line was also provided near the top of the vessel connecting with the gas outlet from the cyclone separator.

The gas outlet from the separator was connected to a knock-out tank consisting of a closed cylindrical vessel 8 feet in height and 4 feet in diameter fitted with a tangential entry nozzle and an axial exit nozzle to separate residual liquid ammonia entrained in the gas stream.

The separator was operated at temperatures of 25°, 45°, and 50° C. and a pressure of 1,200 p.s.i.g. with about 2,000 lbs./per hour of feed. The knock-out tank was operated at a pressure of about 550 p.s.i.g. The analyses of the feed, the liquid recovery stream, and the off-gas from the knock-out tank are shown in Table I.

TABLE I.—SEPARATOR OF HYDROGEN, METHANE, AND AMMONIA—1200 p.s.i.g. AT VARIOUS TEMPERATURES

|  | Input to Separator | | | Off-gas From Knockout Tank | | | Liquid Recovery | | |
| --- | --- | --- | --- | --- | --- | --- | --- | --- | --- |
|  | 25° C. | 45° C. | 50° C. | 25° C. | 45° C. | 50° C. | 25° C. | 45° C. | 50° C. |
| Mole percent $H_2$ | 1.318 | 2.04 | 2.615 | 71.20 | 62.48 | 60.431 | 0.55 | 0.40 | 0.346 |
| Mole percent $N_2$ | 0.073 | 0.07 | 0.069 | 1.10 | 0.84 | 0.720 | 0.07 | 0.05 | 0.041 |
| Mole percent $CH_4$ | 0.670 | 0.55 | 0.510 | 8.30 | 6.28 | 5.756 | 0.63 | 0.39 | 0.306 |
| Mole percent $NH_3$ | 94.555 | 94.01 | 93.495 | 19.40 | 30.40 | 33.093 | 99.28 | 95.76 | 95.873 |
| Other | 3.384 | 3.33 | 3.311 |  |  |  | 3.47 | 3.40 | 3.432 |
| $H_2/CH_4$ | 1.97 | 3.71 | 5.12 | 8.56 | 9.95 | 10.46 | 0.872 | 1.025 | 1.14 |

Minor impurities may be present in the system without substantially affecting the recovery process described hereinabove.

I claim:

1. A process for the separation of a feed mixture consisting essentially of from 30 to 98 mole percent of ammonia with from 2 to 70 mole percent of hydrogen and methane, the hydrogen to methane molar ratio being from about 0.5 to 10, which comprises adjusting the pressure of the feed mixture to 1,000–2,000 p.s.i.g. at a temperature of from 25° C. to 100° C., separating a gas phase containing predominately hydrogen to methane said gas phase having a hydrogen to methane ratio substantially greater than the hydrogen to methane ratio of said feed mixture, and a liquid phase consisting perdominately of methane dissolved in liquid ammonia.

2. Process of claim 1 wherein the pressure of the said feed is adjusted to 1,000–1,300 p.s.i.g.

3. Process of claim 2 wherein the temperature of the feed is from 25° C. to 50° C.

References Cited
UNITED STATES PATENTS

| | | | |
|---|---|---|---|
| 1,518,421 | 12/1924 | Wakeford | 62—11 |
| 2,881,053 | 4/1959 | Bowers | 55—70 X |

REUBEN FRIEDMAN, *Primary Examiner.*

J. W. ADEE, *Assistant Examiner.*

UNITED STATES PATENT OFFICE
CERTIFICATE OF CORRECTION

Patent No. 3,343,339　　　　　　　　　　September 26, 1967

Jerrold J. Johnston

It is certified that error appears in the above identified patent and that said Letters Patent are hereby corrected as shown below:

Columns 1 and 2, TABLE I, eighth column, line 4 thereof, for "99.28" read -- 95.28 --; column 3, line 6, for "to" read -- and --; line 8, for "ratio of" read -- ratio of the --.

Signed and sealed this 15th day of July 1969.

(SEAL)
Attest:

Edward M. Fletcher, Jr.　　　　　　　　WILLIAM E. SCHUYLER, JR.
Attesting Officer　　　　　　　　　　　　Commissioner of Patents